United States Patent
Schroeder et al.

(10) Patent No.: US 12,023,991 B2
(45) Date of Patent: Jul. 2, 2024

(54) METHOD FOR OPERATING A COOLANT CIRCUIT OF A REFRIGERATION SYSTEM OF A VEHICLE

(71) Applicant: AUDI AG, Ingolstadt (DE)

(72) Inventors: Dirk Schroeder, Manching (DE); Christian Rebinger, Munich (DE); Helmut Rottenkolber, Mindelstetten (DE)

(73) Assignee: AUDI AG, Ingolstadt (DE)

( * ) Notice: Subject to any disclaimer, the term of this patent is extended or adjusted under 35 U.S.C. 154(b) by 284 days.

(21) Appl. No.: 17/634,838

(22) PCT Filed: Feb. 19, 2020

(86) PCT No.: PCT/EP2020/054310
§ 371 (c)(1),
(2) Date: Feb. 11, 2022

(87) PCT Pub. No.: WO2021/032324
PCT Pub. Date: Feb. 25, 2021

(65) Prior Publication Data
US 2022/0324296 A1    Oct. 13, 2022

(30) Foreign Application Priority Data
Aug. 21, 2019   (DE) .................. 102019212503.4

(51) Int. Cl.
*B60H 1/32* (2006.01)
*B60H 1/00* (2006.01)

(52) U.S. Cl.
CPC ....... *B60H 1/3205* (2013.01); *B60H 1/00278* (2013.01); *B60H 2001/325* (2013.01);
(Continued)

(58) Field of Classification Search
CPC .............. B60H 1/3205; B60H 1/00278; B60H 2001/325; B60H 2001/3251;
(Continued)

(56) References Cited

U.S. PATENT DOCUMENTS 5,701,753 A * 12/1997 Iritani .................. B60H 1/3205
                                                      62/211
8,511,077 B2 * 8/2013 Schwarzkopf ........ F01N 3/2066
                                                      60/320

(Continued)

FOREIGN PATENT DOCUMENTS

CN       103702848 A      4/2014
DE    102015007564 A1    12/2016
(Continued)

OTHER PUBLICATIONS

International Preliminary Report on Patentability (with English Translation) issued on Feb. 17, 2022, in corresponding International Application No. PCT/EP2020/054310; 13 pages.
(Continued)

*Primary Examiner* — Nelson J Nieves
(74) *Attorney, Agent, or Firm* — Maier & Maier, PLLC (57) ABSTRACT

A method for operating a coolant circuit of a refrigeration system of a vehicle having multiple system sections. A single pressure sensor is located in each system section. A temperature sensor is arranged downstream at each component to be balanced in the system sections, such as heat exchangers and a coolant compressor. The sensor signals of the pressure and temperature sensors are supplied to a control unit for the control or regulation of the refrigeration system. Furthermore, a pressure approximation value at the position of the temperature sensor is calculated by a pressure loss value determined using a pressure loss calculation function starting from the position of the pressure sensor arranged in the system section of the component up to the (Continued)

position of the temperature sensor if the temperature sensor and the pressure sensor are arranged at different positions in the system section.

10 Claims, 2 Drawing Sheets

(52) U.S. Cl.
CPC ............... *B60H 2001/3251* (2013.01); *B60H 2001/3252* (2013.01); *B60H 2001/3257* (2013.01); *B60H 2001/326* (2013.01); *B60H 2001/3263* (2013.01)

(58) Field of Classification Search
CPC .... B60H 2001/3252; B60H 2001/3257; B60H 2001/326; B60H 2001/3263
See application file for complete search history.

(56) References Cited

U.S. PATENT DOCUMENTS

| | | | | |
|---|---|---|---|---|
| 9,242,527 | B2* | 1/2016 | Graaf | F25B 5/02 |
| 11,279,205 | B2* | 3/2022 | Schroeder | B60H 1/00885 |
| 2002/0023451 | A1* | 2/2002 | Kuroda | F25B 49/022 |
| | | | | 62/228.4 |
| 2005/0034473 | A1* | 2/2005 | Casar | F25B 9/008 |
| | | | | 62/324.1 |
| 2005/0039959 | A1* | 2/2005 | Fruhauf | B60H 1/00878 |
| | | | | 429/434 |
| 2006/0137388 | A1* | 6/2006 | Kakehashi | F25B 5/02 |
| | | | | 62/524 |
| 2007/0000262 | A1* | 1/2007 | Ikegami | F25B 41/00 |
| | | | | 62/170 |
| 2007/0028633 | A1* | 2/2007 | Suzuki | B60H 1/3211 |
| | | | | 62/190 |
| 2007/0151270 | A1* | 7/2007 | Matsunaga | F25B 9/008 |
| | | | | 62/216 |
| 2007/0251265 | A1* | 11/2007 | Kurata | F25B 5/02 |
| | | | | 62/527 |
| 2008/0098757 | A1* | 5/2008 | Takeuchi | F25B 41/00 |
| | | | | 62/227 |
| 2011/0174000 | A1* | 7/2011 | Richter | B60H 1/00064 |
| | | | | 62/93 |
| 2012/0125032 | A1* | 5/2012 | Graaf | B60H 1/323 |
| | | | | 62/318 |
| 2013/0227973 | A1* | 9/2013 | Kang | F25B 30/02 |
| | | | | 62/140 |
| 2014/0075966 | A1* | 3/2014 | Schmitz | B60H 1/00921 |
| | | | | 165/42 |
| 2014/0075972 | A1* | 3/2014 | Heyl | B60H 1/00507 |
| | | | | 62/324.1 |
| 2016/0339761 | A1* | 11/2016 | Enomoto | B60H 1/00899 |
| 2017/0182867 | A1* | 6/2017 | Durrani | B60H 1/00342 |
| 2019/0351740 | A1* | 11/2019 | Filipkowski | B60H 1/32284 |
| 2020/0049392 | A1* | 2/2020 | Tanaka | F25B 41/39 |
| 2020/0247213 | A1* | 8/2020 | Schroeder | B60H 1/00278 |
| 2020/0346520 | A1* | 11/2020 | Ishizeki | B60H 1/00328 |
| 2021/0086585 | A1* | 3/2021 | Chatham | B60H 1/00885 |
| 2022/0258569 | A1* | 8/2022 | Benouali | B60H 1/00278 |
| 2023/0234421 | A1* | 7/2023 | Rebinger | B60H 1/32281 |
| | | | | 165/104.32 |
| 2023/0294481 | A1* | 9/2023 | Rebinger | F25B 6/02 |
| | | | | 62/239 |
| 2023/0322045 | A1* | 10/2023 | Hammer | B60H 1/3229 |
| | | | | 62/132 |

FOREIGN PATENT DOCUMENTS

| | | | |
|---|---|---|---|
| DE | 102016005782 | A1 | 11/2017 |
| DE | 102015104464 | B4 | 8/2018 |
| DE | 102017204122 | A1 | 9/2018 |
| DE | 112016005715 | T5 | 9/2018 |
| DE | 112017003010 | T5 | 2/2019 |
| DE | 102018122675 | A1 | 4/2019 |
| DE | 102018201165 | B3 | 5/2019 |
| DE | 102019201428 | A1 | 8/2020 |
| DE | 102019212503 | A1 | 2/2021 |
| EP | 2119912 | A1 | 11/2009 |
| JP | 2020059369 | A * | 4/2020 ......... B60H 1/00278 |

OTHER PUBLICATIONS

German Examination Report issued on Apr. 24, 2020 in corresponding German Patent Application No. 102019212503.4; 36 pages with English Translation.
Office Action issued on Aug. 2, 2023, in corresponding Chinese Application No. 202080050142.2, 18 pages.

* cited by examiner

METHOD FOR OPERATING A COOLANT CIRCUIT OF A REFRIGERATION SYSTEM OF A VEHICLE

FIELD

The invention relates to a method for operating a coolant circuit of a refrigeration system of a vehicle.

BACKGROUND

The use of coolant circuits in vehicle air-conditioners is known, in which context some variants provide a 2-evaporator system or multi evaporator system, namely a front evaporator and a rear system evaporator. Depending on the interconnection and active operation of the respective heat transfer, the need for required active coolant in the coolant circuit varies.

Electrified vehicles require, in addition to the front evaporator as at least one interior evaporator, a separate cooling device for the conditioning and temperature control of the energy storage device generally implementable as a high-voltage battery. Such a cooling device can be implemented by means of the coolant circuit and is referred to as active battery cooling. Such a cooling device is implemented as a coolant-refrigerant heat exchanger which operates as an evaporator (by cooling an air flow) or as a chiller (by cooling a refrigerant flow).

Furthermore, equipping coolant circuits of vehicle refrigeration systems with electrical expansion elements and electrical shutoff elements, which communicate with control devices, is known. An electrical expansion element is thus moved by means of a control device on a defined opening cross section to set and achieve certain target variables. An electrical shutoff element is used to set the flow direction of the coolant in the coolant circuit, whereby a certain system interconnection of the coolant circuit is implemented.

To be able to provide the required information for each expansion element and each shutoff element in a coolant circuit, but in particular for the control or regulation thereof, a certain number of pressure and/or temperature sensors is required, the number of which is dependent on the number of the evaporators and the functions implemented using the coolant circuit, for example, a heat pump function in addition to a refrigeration system operation. It is thus necessary, for example, in a coolant circuit having multiple evaporators, for the case in which an electrical expansion element is connected upstream of each evaporator, that multiple pressure and temperature sensors have to be used on the low-pressure side for this purpose. Such combined pressure and temperature sensors are expensive components and have to be incorporated, at least with respect to detecting the pressure signal, into the air conditioning lines or the heat exchangers of the coolant circuit which are used and to be balanced and have to have contact with the coolant.

A coolant circuit of a refrigeration system for a vehicle has, according to DE 10 2018 122 675 A1, a coolant compressor, an external coolant-air heat exchanger operable as a condenser/gas cooler or heat pump evaporator, a further coolant-air heat exchanger arranged in an air conditioning unit as an evaporator, a further coolant-refrigerant heat exchanger as a chiller, and a further coolant-air heat exchanger arranged in the air conditioning unit as a heat register. Various sensors are provided for regulating the refrigeration system. Thus, pressure-temperature sensors are located at the high-pressure outlet of the coolant compressor, at the outlet of the external coolant-air heat exchanger, and at the outlet of the chiller. Temperature sensors are arranged at the outlet of the evaporator and at the outlet of the heating register.

DE 10 2017 204 122 A1 also describes a coolant circuit of a refrigeration system for a vehicle having a coolant compressor, a condenser/gas cooler, an internal heat exchanger, an evaporator having associated expansion element, and a low-pressure coolant collector. A pressure-temperature sensor downstream of the coolant compressor, a further pressure-temperature sensor downstream of the condenser/gas cooler, and a further pressure-temperature sensor arranged between the low-pressure coolant collector and the internal heat exchanger are provided in the coolant circuit for the control of the refrigeration system.

An R744 coolant circuit having a mechanically driven compressor, a gas cooler, an accumulator, an internal heat exchanger, an expansion element that can be electrically regulated, and an evaporator as well as a regulating unit having sensors for pressure and temperature is known from DE 10 2015 104 464 A1. A temperature and pressure sensor for measuring the pressure and the temperature of the coolant after the compressor, a temperature sensor for measuring the temperature of the coolant after the gas cooler, and a temperature sensor for measuring the temperature of the cooled air in the evaporator are provided as sensors.

SUMMARY

The object of the invention is to specify an improved method for operating a coolant circuit of a refrigeration system having at least two system sections, in each of which a defined operating pressure is settable, and only a minimum number of sensors measuring pressure and temperature of the coolant is required.

In this method for operating a coolant circuit of a refrigeration system of a vehicle in refrigeration system operation having at least two system sections, namely a low-pressure system section and a high-pressure system section, in each of which a system operating state with respect to pressure and temperature of the coolant is settable by means of a control unit, a respective pressure sensor arranged in each system section, wherein the sensor signals of the pressure sensors are transmitted to the control unit for the control or regulation of the refrigeration system, and heat exchangers arranged in the system sections as components of the coolant circuit, wherein coolant is conveyed from the low-pressure system section into the high-pressure system section by means of a coolant compressor as a further component of the coolant circuit, it is provided that a temperature sensor for detecting the coolant temperature is connected downstream at the outlet of the component thereof for the control or regulation of at least one component by means of the control unit, the sensor signal of the temperature sensor is transmitted to the control unit, a pressure approximation value at the position of the temperature sensor is calculated by means of a pressure loss value determined using a pressure loss calculation function starting from the position of the pressure sensor arranged in the system section of the component up to the position of the temperature sensor if the temperature sensor and the pressure sensor are arranged at different positions in the system section, and the refrigeration system is regulated at least as a function of the calculated pressure approximation value.

According to the invention, it is sufficient to arrange at most only one single pressure sensor within each system section of the coolant circuit, in each of which an independent operating pressure level is set or regulated. If the coolant circuit comprises at least one low-pressure system section and one high-pressure system section, only one pressure sensor is required there in each case, which can be arranged at any point of the respective system section. If such a coolant circuit also comprises a heat pump function, a further system section, namely a moderate-pressure system section is configured, which is also associated with a pressure sensor that is positionable at any point of this moderate-pressure system section.

At each component to be controlled by means of the control unit, i.e, thus at each component to be balanced, a temperature sensor is arranged downstream thereof.

The sensor signals of these pressure sensors and temperature sensors are supplied as actual values to the control unit, which generates corresponding control signals for controlling or regulating the components as a function of target values. The control signal(s) is/are supplied, for example, to the coolant compressor and/or the expansion elements controlling the state of the coolant in the heat exchangers.

Since the pressure loss is dependent on the geometric boundary conditions, such as line length, line course, and line cross section of the relevant line section, on the one hand, and is dependent on the quantity of the coolant conveyed by the coolant compressor, on the other hand, first the value of the conveyed coolant has to be determined. Furthermore, a corresponding characteristic map is to be provided for each line section or for each component for the calculation of the pressure loss between the position of the pressure sensor and that position of the temperature sensor in the coolant circuit for which the pressure approximation is to be calculated, which characteristic map is generated experimentally, for example, by means of a test stand or by simulation.

One advantageous embodiment of the invention provides that
    an external direct or indirect coolant-air heat exchanger is arranged in the high-pressure system section,
    the pressure sensor provided for the high-pressure system section is arranged downstream of the high-pressure outlet of the coolant compressor or the coolant-air heat exchanger, and
    one temperature sensor is arranged downstream of each of the coolant compressor and the external direct or indirect coolant-air heat exchanger.

In this embodiment according to the invention, starting from the pressure sensor in the high-pressure system section, the pressure loss over the external direct or indirect coolant-air heat exchanger is ascertained by means of the pressure loss calculation function and, together with the pressure measured value ascertained by means of the pressure sensor, the actual pressure is calculated or estimated therefrom as the pressure approximation value, in each case as a function of the position of the pressure sensor, namely at the respective position to be balanced within the high-pressure system section. This high-pressure approximation value is used together with other parameters for the control or regulation of the refrigeration system operation of the refrigeration system.

In a direct coolant-air heat exchanger, there is a direct contact of the heat exchanger with the air, for example, the interior air or the ambient air of the vehicle. In an indirect coolant-air heat exchanger, the contact to the air is established indirectly by means of a further heat exchanger, which is thermally coupled to the indirect coolant-air heat exchanger, for example, via a refrigerant circuit. If there is a thermal coupling to the ambient air of the vehicle, it is an external heat exchanger, whereas it is an internal heat exchanger in the case of a thermal coupling to the interior air of the vehicle.

A further preferred embodiment of the invention provides that
    a chiller and an evaporator are arranged as components in the low-pressure system section,
    a low-pressure accumulator is arranged in the low-pressure system section,
    the pressure sensor provided for the low-pressure system section is arranged downstream of either the low-pressure accumulator or the chiller, and
    a temperature sensor is arranged downstream in each case from the chiller and the low-pressure accumulator.

In this embodiment according to the invention, starting from the pressure sensor arranged in the low-pressure system section, the pressure loss up to a pressure sensor downstream of the evaporator, and the chiller is ascertained by means of the pressure loss calculation function and the actual pressure is calculated as the pressure approximation value therefrom together with the pressure measured value ascertained by means of the pressure sensor. This pressure approximation value is used together with other parameters for the control or regulation of the refrigeration system operation of the refrigeration system.

Another preferred embodiment of the invention provides that
    an interior evaporator and a chiller are arranged as components in the low-pressure system section,
    a high-pressure accumulator is arranged in the high-pressure system section,
    the pressure sensor provided for the low-pressure system section is arranged either at the low-pressure inlet of the coolant compressor, at the outlet of the chiller, or at the outlet of the interior evaporator, and
    one temperature sensor is arranged at each of the outlet of the chiller, at the outlet of the interior evaporator, and at the low-pressure inlet of the coolant compressor.

In this alternative embodiment according to the invention, in which, instead of the low-pressure accumulator, a high-pressure accumulator or receiver or modulator is provided as a coolant storage device, starting from the pressure sensor arranged in the low-pressure system section, the pressure loss up to a temperature sensor downstream of the evaporator, and the chiller is also ascertained by means of the pressure loss calculation function, and the actual pressure is calculated as the pressure approximation value therefrom together with the pressure measured value ascertained by means of the pressure sensor. This pressure approximation value is used together with other parameters for the control or regulation of the refrigeration system operation of the refrigeration system.

A last preferred embodiment of the invention provides that uniformly calibrated temperature sensors and uniformly calibrated pressure sensors are used. The temperature and pressure sensors can thus be used as standard sensors having a standard calibration and thus the same characteristic curve coordination can be selected at all positions in the coolant circuit.

The method according to the invention can also be implemented, of course, in refrigeration system having a heat pump functionality.

BRIEF DESCRIPTION OF THE FIGURES

Further advantages, features, and details of the invention result from the following description of preferred embodiments and on the basis of the drawings. In the figures.

DETAILED DESCRIPTION

Figure 1:
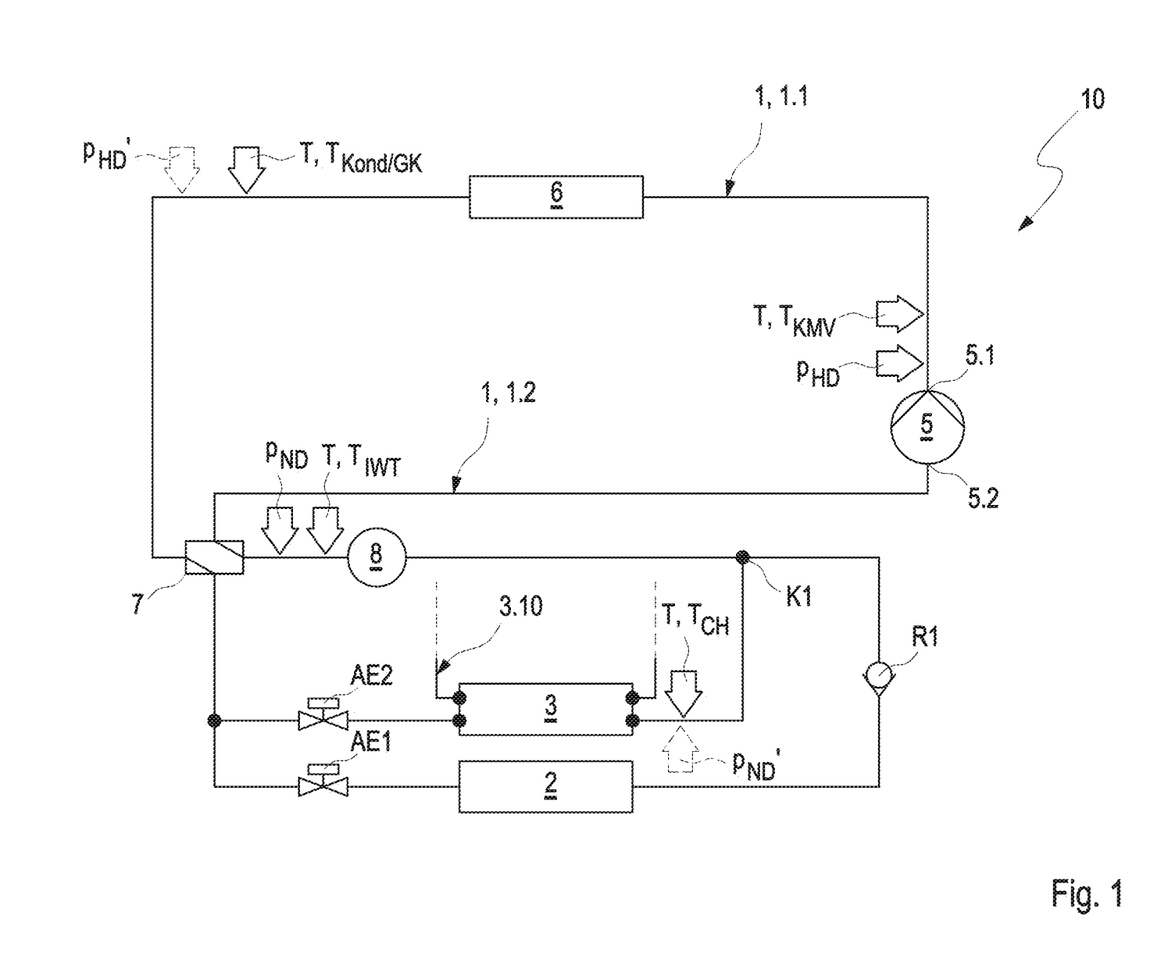
FIG. 1 shows a circuit diagram of a coolant circuit for carrying out an exemplary embodiment of the method according to the invention using a coolant collector arranged on the low-pressure side.
Figure 2:
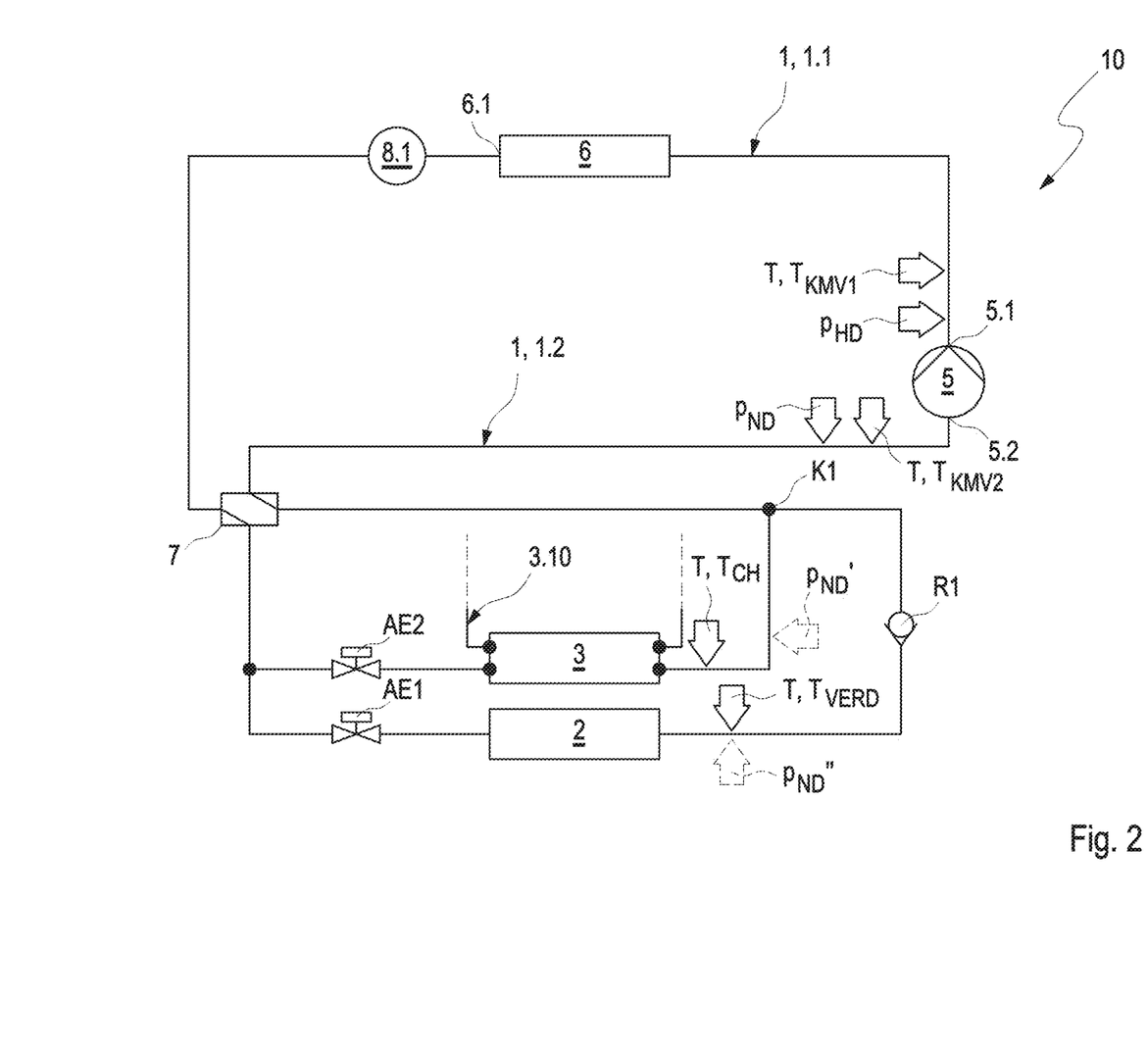
FIG. 2 shows a circuit diagram alternative to the circuit diagram according to FIG. 1 for carrying out an exemplary embodiment of the method according to the invention using a coolant collector arranged on the high-pressure side.

For the sake of simplicity, FIGS. 1 and 2 each show a coolant circuit 1 of a refrigeration system 10 of a vehicle provided solely for AC operation (refrigeration system operation). The functional expansion of the system with respect to a heat pump operation and/or also moderate-pressure operation is omitted here, since the method according to the invention can already be represented in its entirety using the simple interconnection concept and the measures according to the invention can be transferred directly to a coolant circuit having heat pump functionality and the inactive sectors thereof.

The coolant circuits according to FIGS. 1 and 2 are constructed in an identical base structure having two system sections, namely a high-pressure system section 1.1 and a low-pressure system section 1.2, and each differ in the arrangement of a coolant collector as a low-pressure or high-pressure coolant collector 8 or 8.1. It is to be noted here that a coolant collector 8 arranged on the low-pressure side can be used for refrigeration systems 10 operating both in a subcritical and also supercritical manner, whereas a high-pressure collector 8.1 is predominantly used in systems operating solely in a subcritical manner. The high-pressure collector 8.1 can in turn also be integrated into the condenser 6, inter alia, as a so-called modulator.

The coolant circuit 1 according to FIGS. 1 and 2 consists of the following components:

a coolant compressor 5, an external condenser/gas cooler 6 as a direct coolant-air heat exchanger of the high-pressure system section 1.1, which is fluidically connected to the high-pressure outlet of the coolant compressor 5, an interior evaporator 2 as a direct coolant-air heat exchanger of the low-pressure system section 1.2 and an expansion element AE1, which is connected upstream thereof and is designed as an expansion valve, a chiller 3 as a direct coolant-refrigerant heat exchanger of the low-pressure system section 1.2 for cooling an electrical component (for example, a high-voltage battery, an electrical drive component, etc.) of the vehicle having an expansion element AE2 designed as an electrical expansion valve, in which case the chiller 3 is thermally coupled to a coolant circuit 3.10 for cooling the electrical components and the series circuit made up of chiller 3 and associated expansion element AE2 is connected in parallel to the series circuit made up of interior evaporator branch and associated expansion element AE1, a coolant collector, which according to FIG. 1 is connected downstream of the interior evaporator 2 and the chiller 3 as the low-pressure coolant collector 8 and according to FIG. 2 is connected downstream of the external condenser/gas cooler 6 as the high-pressure coolant collector 8.1, and an internal heat exchanger 7, the high-pressure side of which fluidically connects the condenser/gas cooler 6 to the expansion element AE1 of the interior evaporator 2 and to the expansion element AE2 of the chiller 3, whereas its section on the low-pressure side is incorporated according to FIG. 1 between the low-pressure coolant collector 8 and the coolant compressor 5 in the coolant circuit 1 and is incorporated according to FIG. 2 between the chiller 3 or the interior evaporator 2 and the coolant compressor 5.

In the coolant circuit 1 according to FIGS. 1 and 2, the coolant is brought together in a connecting point K1 downstream of the interior evaporator 2 and the chiller 3.

Finally, for the coolant circuit 1 according to FIGS. 1 and 2, an air conditioner control device is provided as a control unit (not shown in the figures), to which input signals to be processed, for example, actual values from pressure and temperature sensors, are supplied in order to generate control signals or target values therefrom as output signals for control of the individual components of the coolant circuit 1. In detail, this means that a system operating state, defined by the pressure and the temperature of the coolant, is set by means of the control unit via the coolant compressor and one expansion element AE1 or AE2 in each case.

A check valve R1 is arranged downstream of the interior evaporator 2 according to FIGS. 1 and 2, which prevents a backflow of coolant via the connecting point K1 into the interior evaporator 2 in the case of inactive interior evaporator 2. Alternatively, a shutoff valve or an expansion element which can be shut off can be arranged at this position. Therefore, the interior evaporator 2 is delimited by the expansion element AE1 associated therewith and by the check valve R1. If no backflow of coolant into the interior evaporator 2 is to be expected during general system operation, but in particular solely in chiller operation, the check valve R1 can be omitted.

The low-pressure coolant collector 8 of the coolant circuit 1 according to FIG. 1 has the task of separating the gaseous phase and the liquid phase of the incoming coolant from one another and storing the liquid coolant in the sense of a volume buffer or bringing it into circulation, depending on the coolant quantity required by the system.

The high-pressure system section 1.1 and the low pressure system section 1.2 of the coolant circuit 1 according to FIG. 1 each comprise at most one pressure sensor. Specifically, the high-pressure system section 1.1 comprises a high-pressure-side pressure sensor, and the low-pressure system section 1.2 comprises a low-pressure-side pressure sensor.

The high-pressure-side pressure sensor can be arranged at various positions of the high-pressure section 1.1. The high-pressure-side pressure sensor is preferably arranged as the pressure sensor $p_{HD}$ directly at the high-pressure outlet 5.1 of the coolant compressor 5. Alternatively, according to the coolant circuit 1 according to FIG. 1, the high-pressure sensor can be arranged downstream of the condenser/gas cooler 6 in the coolant circuit 1 as pressure sensor $p_{HD}'$.

The low-pressure-side pressure sensor can be arranged, according to FIG. 1, at various positions of the low-pressure system section 1.2. It is preferably arranged as the pressure sensor $p_{ND}$ between the low-pressure accumulator 8 and the low-pressure section of the internal heat exchanger 7. Alternatively, this low-pressure-side pressure sensor is positioned between the chiller 3 and the connecting point K1 as the pressure sensor $p_{ND}'$.

The coolant circuit 1 having the high-pressure coolant collector 8.1 also comprises, according to FIG. 2, a single pressure sensor in each case in the high-pressure system section 1.1 and in the low-pressure system section 1.2, namely a high-pressure-side pressure sensor as the pressure sensor $p_{HD}$ in the high-pressure system section 1.1 and a low-pressure-side pressure sensor, which is arranged either as the pressure sensor $p_{ND}$ between the low-pressure side section of the internal heat exchanger 7 and the low-pressure inlet 5.2 of the coolant compressor 5, as the pressure sensor $p_{ND}'$ between the chiller 3 and the connecting point K1, or as the pressure sensor $p_{ND}''$ between the interior evaporator 2 and the check valve R1, which is only reasonable, however, as long as the check valve R1 is not closed, and thus a plausible pressure signal is provided for the entire system.

If the high-pressure coolant collector 8.1 is integrated according to the coolant circuit 1 according to FIG. 2 into the condenser/gas cooler 6, a pressure sensor would also be provided downstream of the condenser/gas cooler 6. Since such systems are generally systems which are exclusively provided for subcritical system operation, however, a pressure sensor can be omitted at this position and instead preferably provided at the outlet side of the coolant compressor 5.

In general, with respect to the positioning of pressure sensors, at most one pressure sensor is preferably to be provided in a pressure-forming system section, which sensor can in turn be theoretically positioned at any point between the initial and the final occurrence of the respective working pressure, i.e., on the low-pressure side between the outlet of the expansion element(s) AE1, AE2 and the inlet of the coolant compressor 5 and also on the high-pressure side between the outlet of the coolant compressor 5 and the inlet into the expansion element(s) AE1, AE2.

To operate the coolant circuit 1 according to FIGS. 1 and 2 optimally, measured values of pressure and temperature at various positions in the coolant circuit 1 have to be present in all operating points, which are supplied to a control unit (not shown in FIGS. 1 and 2), for example, an air conditioner control device, for evaluation to generate control signals therefrom, inter alia for the electrical expansion elements AE1 and AE2 and the coolant compressor 5. Using the control signals, the electrical expansion elements are set to a certain opening cross section to achieve the required variables for optimal high pressure, supercooling, or also overheating.

Temperature sensors T are arranged in the coolant circuit 1 having the low-pressure coolant collector 8 according to FIG. 1 at the outlet of the chiller 3 as the temperature sensor $T_{CH}$, at the high-pressure outlet 5.1 of the coolant compressor 5 as the temperature sensor $T_{KMV}$, and at the outlet of the condenser/gas cooler 6 as the temperature sensor $T_{Kond/GK}$.

Furthermore, at least one further temperature sensor T (not shown in FIG. 1) can be provided on the inlet side of the coolant compressor 5. However, this is important in particular for heat pump applications. In particular, if needed, a temperature sensor T (not shown in FIG. 1) can be connected downstream of the interior evaporator 2.

The temperature sensors T can be embodied as a standard sensor or as a sensor especially adapted to a specific temperature range. In this case, a calibration to a specific measurement range is carried out with extremely accurate value detection or ultrahigh measurement accuracy, whereas deviations from target values to actual values generally become greater outside the defined measurement range. If this is negligible, a standard calibration can thus be used and the same characteristic curve coordination can be selected at all positions in the coolant circuit.

A low-pressure sensor and a high-pressure sensor generally differ by way of the measurement range thereof or the ranges of highest measurement accuracy. With sufficient measurement accuracy, a standard sensor can be used for measuring the pressure, independently of the respective pressure level.

Temperature sensors T are also arranged in the coolant circuit 1 having the high-pressure coolant collector 8.1 according to FIG. 2, namely at the outlet of the chiller 3 as the temperature sensor $T_{CH}$, at the outlet of the interior evaporator 2 as the temperature sensor $T_{VERD}$, as the temperature sensor $T_{KMV1}$ at the high-pressure outlet 5.1, and as the temperature sensor $T_{KMV2}$ at the low-pressure inlet 5.2 of the coolant compressor 5.

However, since only one pressure sensor is present in each case in both the high-pressure system section 1.1 and also in the low-pressure system section 1.2 in the coolant circuits 1 according to FIGS. 1 and 2, pressure values, called pressure approximation values hereinafter, have to be calculated for those positions which differ from the positions of these pressure sensors and at which a temperature sensor is located. A pressure approximation value determined for a position forms, together with the associated temperature value, the foundation for balancing the component associated with this position.

Balancing of a component is to be understood as the process, according to which high operating pressures, supercooling actions, and/or overheating actions of the coolant defined for the optimal operation of the coolant circuit 1 are to be set, in particular at the outlet of heat exchangers such as condenser/gas cooler 6, interior evaporator 2, and chiller 3, and in the process a target value comparison takes place based on calculation on the basis of the measured variables using the actual values and the corresponding readjustment takes place inside the system using the movement of the expansion elements AE1, AE2—prompted via the control unit. The measured values of the sensors are directly related to the material data of the coolant for this purpose and the actual variables are thus determined. The target specification for the new target variables is carried out on this basis. Thus, for example, balancing at the coolant compressor 5 as a component of the coolant circuit I is carried out in that the applied system high-pressure is detected via the pressure sensor $p_{HD}$ and the exit temperature is monitored via the temperature sensor $T_{KMV}$; both variables are compared to the permissible maximum variables and a reduced activation of the compressor 5 takes place if necessary.

Balancing at the interior evaporator 2 as a component of the coolant circuit I or at the chiller 3 as a component of the coolant circuit 1 is carried out in that the applied pressure and temperature values are detected on the coolant side and, for example, an actual overheating of the coolant at the outlet of the respective heat exchanger is determined via a calculation based on material data. This value is compared to a target value and corrected if needed accordingly by acting on the expansion element connected upstream from the respective heat exchanger.

Finally, balancing is carried out at the condenser/gas cooler 6 as a component of the coolant circuit in that, on the basis of the measured values of pressure and temperature, an existing supercooling determined based on material data is determined during subcritical system operation, or an existing high pressure is determined, compared to a target value, and readjusted by action of the control unit on the corresponding actuators.

If the single high-pressure-side pressure sensor is arranged in the coolant circuit 1 according to FIG. 1 as the pressure sensor $p_{HD}$ at the high-pressure outlet 51 of the coolant compressor 5, a pressure approximation value $p_{HD\_Kond/GK}$ is calculated at the position of the temperature sensor T denoted as $T_{Kond/GK}$.

To calculate this pressure approximation value $p_{HD\_Kond/GK}$, a pressure loss calculation function is provided and implemented as an algorithm in the control unit of the refrigeration system 10. Starting from the position of the pressure sensor $p_{HD}$, the pressure loss $\Delta p_{Kond/GK}$ up to the position of the temperature sensor $T_{Kond/GK}$ is calculated by means of the pressure loss calculation function on the basis of the coolant mass flow $m_{KM\_berechnet}$ conveyed by the coolant compressor 5. This pressure loss $\Delta p_{Kond/GK}$ also results if the high-pressure-side pressure sensor is located as the pressure sensor $p_{HD}'$ at the position of the temperature sensor $T_{Kond/GK}$. This pressure loss $\Delta p_{Kond/GK}$ thus represents the pressure loss over the heat exchanger 6, independently of the position of the high-pressure sensor $p_{HD}$ or $p_{HD}'$. From this pressure loss $\Delta p_{Kond/GK}$ and the high-pressure measured value $p_{ist\_HD}$ of the pressure sensor $p_{HD}$ or $p_{HD}'$, the pressure approximation value $p_{HD\_Kond/GK}$ at the outlet of the condenser/gas cooler 6 or the pressure approximation value $p_{HD\_KMV}$ at the high-pressure outlet 5.1 of the coolant compressor 5 is calculated in dependence on the position of the pressure sensor.

In addition, it is to be noted that the working pressure after the coolant compressor 5 can also be ascertained and back-calculated by way of a high-pressure-side arrangement of a pressure sensor in the section downstream of the internal heat exchanger 7 to the respective expansion elements AE1 and AE2 by determinable pressure loss fractions via the internal heat exchanger and the condenser/gas cooler 6.

This method is explained in detail hereinafter.

Firstly, the coolant mass flow $m_{KM\_berechnet}$ presently conveyed by the coolant compressor 5 is calculated from its operating data, in that an approximate statement about the implemented volume flow and the mass flow resulting therefrom can be made via the relationship of the compressor speed, the pressure ratio, and possibly the volumetric efficiency. The values can be taken in approximation from a corresponding characteristic map.

In the next step, a corresponding pressure loss $\Delta p_{Kond/GK}$ is determined in each case by means of a mass flow-pressure loss characteristic curve, or any characteristic curve of a comparable type which specifies the pressure loss between the position of the pressure sensor $p_{HD}$ or $p_{HD}'$ and the position of the temperature sensor $T_{Kond/GK}$ or $T_{KMV}$ (and in addition for each further temperature sensor positioned in the high-pressure-side system section) as a function of the conveyed mass flow and the geometry data of the relevant line section between the position of the pressure sensor pip and the position of the temperature sensor $T_{Kond/GK}$ (such as line length, line cross section, curvature, etc.) and the heat exchanger 6. These mass flow-pressure loss characteristic curves are stored as a characteristic curve map in the control unit of the refrigeration system 10 and are generated on a test stand or by simulation. Accordingly, there is also a mass flow-pressure loss characteristic curve if the pressure sensor is arranged as the pressure sensor $p_{HD}'$ at the position of the temperature sensor $T_{Kond/GK}$ or at any further arbitrary position of the high-pressure section 1.1, delimited by the high-pressure outlet 5.1 of the coolant compressor 5 and the inlet into the at least one expansion element AE1 or AE2.

The pressure approximation value $p_{HD\_Kond/GK}$ or $p_{HD\_KMV}$, respectively, is calculated from the pressure loss $\Delta p_{Kond/GK}$ and the high-pressure measured value $p_{ist\_HD}$ of the pressure sensor $p_{HD}$ or $p_{HD}'$. If the high-pressure sensor is arranged as the pressure sensor $p_{HD}$ at the high-pressure outlet 5.1 of the coolant compressor 5 according to FIG. 1, the following results:

$$p_{HD\_Kond/GK} = p_{ist\_HD} - \Delta p_{Kong/GK}$$

The pressure loss $\Delta p_{Kond/GK}$ ideally includes both the line influences and also the heat transfer influences, i.e., all components installed between the two positions to be balanced are also incorporated into the balancing.

If the pressure sensor is arranged as the pressure sensor $p_{HD}'$ at the position of the temperature sensor $T_{Kond/G}$, the following results:

$$p_{HD\_KMV} = p_{ist\_HD} + \Delta p_{Kond/GK}$$

For further alternative positions of the high-pressure-side pressure sensor, the analogous procedure is implemented.

If the single low-pressure-side pressure sensor is arranged as the pressure sensor $p_{ND}$ in the coolant circuit 1 according to FIG. 1 between the low-pressure coolant collector 8 and the low-pressure-side section of the internal heat exchanger 7, a pressure approximation value $p_{ND\_CH}$ is calculated at the position of the temperature sensor $T_{CH}$. In contrast, if the low-pressure-side pressure sensor is arranged as the pressure sensor $p_{ND}'$ between the chiller 3 and the connecting point K1, a pressure approximation value $p_{ND\_IWT}$ is calculated at the position of the temperature sensor $T_{IWT}$.

To calculate these pressure approximation values $p_{ND\_CH}$ and $p_{ND\_UWT}$, a pressure loss calculation function is provided and implemented as an algorithm in the control unit of the air conditioning system 10. Starting from the position of the pressure sensor $p_{ND}$ or $p_{ND}'$ arranged on the low-pressure side, the pressure loss $\Delta p$ occurring up to the position of the respective temperature sensor $T_{CH}$ or $T_{IWT}$ (and additionally for any further temperature sensor positioned in the low-pressure-side system section) is calculated on the basis of the coolant mass flow $m_{KM\_berechnet}$ conveyed by the coolant compressor 5 by means of the pressure loss calculation function, inter alia, as a function of the geometric conditions (such as line length, line cross section, curvatures, etc,) of those line sections which connect the low-pressure-side pressure sensor to the position of the corresponding temperature sensor. The pressure approximation value $p_{ND\_CH}$ or $p_{ND\_IWT}$ is calculated from this pressure loss $\Delta p$ and the low-pressure measured value $p_{ist\_ND}$ of the pressure sensor $p_{ND}$ or $p_{ND}'$.

This method is explained in detail hereinafter.

First, the coolant mass flow $m_{KM\_berechnet}$ presently conveyed by the compressor 5 is calculated from its operating data, as already explained above.

In the next step, by means of a mass flow-pressure loss characteristic curve or any comparable characteristic curve which indicates the pressure loss between the position of the pressure sensor $p_{ND}$ or $p_{ND}'$ and the position of the temperature sensor $T_{CH}$ or $T_{IWT}$, the corresponding pressure loss $\Delta p_{CH}$ is determined. These mass flow-pressure loss characteristic curves are stored as a characteristic curve map in the control unit of the refrigeration system 10 and are generated on a test stand or by simulation as a function of the geometric conditions of the line section between the low-pressure-side pressure sensor and the position of the corresponding temperature sensor.

The pressure approximation value is calculated from the sum of the pressure loss and the low-pressure measured value $p_{ist\_ND}$ of the pressure sensor $p_{ND}$ or $p_{ND}'$:

$$p_{ND\_CH} = p_{ist\_ND} + p_{CH}$$

For the calculation of the pressure approximation value $p_{ND\_CH}$ at the chiller 3, the pressure loss occurring in the corresponding line sections due to the cross sections, curvatures, constriction, etc. is, of course, to be taken into consideration. A pressure loss calculation chain thus results for the pressure sensor $p_{ND}$, which consists of the components low-pressure accumulator 8 and the line sections.

If only the pressure sensor $p_{ND}'$ placed between the chiller 3 and the connecting point K1 is provided as the low-pressure-side pressure sensor, such a pressure loss calculation chain for determining the pressure approximation value $p_{ND\_IWT}$ at the position of the temperature sensor $T_{IWT}$ also only consists of the components low-pressure accumulator 8 and the corresponding line sections.

For each component which has to be incorporated into the pressure loss calculation chain between the position of the pressure sensor $p_{ND}$ or $p_{ND}'$ and the point for which the pressure approximation value is to be calculated, a pressure loss is to be ascertained on the test stand or by simulation as a function of the presently conveyed coolant mass flow and the geometric conditions of the corresponding line section, to be able to generate the corresponding mass flow-pressure loss characteristic curve therefrom for such a pressure loss calculation chain.

The respective pressure approximation value is calculate n the total of the respective pressure loss and the low-pressure measured value $p_{ist\_ND}$:

$p_{ND\_CH} = p_{ist\_ND} + \Delta p_{CH}$, in the case of a pressure sensor $p_{ND}$ $p_{ND\_IWT} = p_{ist\_ND} - \Delta p_{CH}$, in the case of a pressure sensor The values of the pressure loss are to be provided with positive or negative sign "+" or "−", respectively, as a function of the location of the low-pressure-side pressure sensor relative to the position of the corresponding temperature sensor.

The analogous procedure is implemented for further alternative positions of the low-pressure-side pressure sensor.

The determination of pressure approximation values for the coolant circuit according to FIG. 2 is described hereinafter.

In the high-pressure system section 1.1 of the coolant circuit 1, the pressure sensor $p_{HD}$ is arranged as the single high-pressure-side pressure sensor at the high-pressure outlet 5.1 of the coolant compressor 5, thus between the compressor and the heat exchanger 6. For this position of the pressure sensor $p_{HD}$, a pressure approximation value $p_{HD\_Kond/GK}$ is calculated at the outlet 6.1 of the heat exchanger 6.

To calculate this high-pressure approximation value $p_{HD\_Kond/GK}$, a pressure loss calculation function is provided and implemented as an algorithm in the control unit of the refrigeration system 10. Starting from the position of the pressure sensor $p_{HD}$, the pressure loss $\Delta p_{Kond/GK}$ up to the outlet 6.1 of the heat exchanger 6 is calculated by means of the pressure loss calculation function on the basis of the coolant mass flow $m_{KM\_berechnet}$ conveyed by the coolant compressor 5. The high-pressure approximation value $p_{HD\_Kond/GK}$ is calculated from this pressure loss $\Delta p_{Kond/GK}$ and the high-pressure measured value $p_{ist\_HD}$ of the pressure sensor $p_{HD}$.

This method is explained in detail hereinafter.

First, the coolant mass flow $m_{KM\_berechnet}$ presently conveyed by the coolant compressor 5 is calculated from its operating data, as already explained above.

In the next step, the corresponding pressure loss $\Delta p_{Kond/GK}$ is determined in each case by means of a mass flow-pressure loss characteristic curve, which indicates the pressure loss between the position of the pressure sensor $p_{HD}$ and the outlet 6.1 of the heat exchanger 6 as a function of the conveyed mass flow and the geometry data (line length, line cross section, curvatures, etc.) of the corresponding line sections of the coolant circuit 1 between the position of the pressure sensor $p_{HD}$ and the outlet 6.1 of the heat exchanger 6 and the additional components having active flow through them. These mass flow-pressure loss characteristic curves are stored as a characteristic curve map in the control unit of the refrigeration system 10 and are generated on a test stand or by simulation.

The pressure approximation value $p_{HD\_Kond/GK}$ is calculated according to the following formula from the pressure loss $\Delta p_{Kond/GK}$ and the high-pressure measured value $p_{ist\_HD}$:

$$p_{HD\_Kond/GK} = p_{ist\_HD} - \Delta p_{Kond/GK}.$$

For further alternative positions of the high-pressure-side pressure sensor, the analogous procedure is implemented and back-calculated up to the position to be balanced.

In the low-pressure system section of the coolant circuit 1 according to FIG. 2, the single low-pressure-side pressure sensor is either arranged as the pressure sensor $p_{ND}$ between the low-pressure-side section of the internal heat exchanger 7 and the low-pressure inlet 5.2 of the coolant compressor 5, as the pressure sensor $p_{ND}'$ between the chiller 3 and the connecting point K1, or as the pressure sensor $p_{ND}''$ between the interior evaporator 2 and the check valve R1.

If the pressure sensor is located as the pressure sensor $p_{ND}$ at the first-mentioned position, a pressure approximation value $p_{ND\_CH}$ and $p_{ND\_VERD}$ is determined in each case for the positions of the temperature sensors T downstream of the chiller 3 and the interior evaporator 2, thus the temperature sensors $T_{CH}$ and $T_{VERD}$.

If the pressure sensor is located as the pressure sensor $p_{ND}'$ at the second-mentioned position, a pressure approximation value $p_{ND\_VERD}$ and $p_{ND\_KMV}$ is determined in each case for the positions of the temperature sensors T downstream of the interior evaporator 2 and at the inlet side of the coolant compressor 5, thus the temperature sensors $T_{VERD}$ and $T_{KMV2}$.

If the pressure sensor is located as the pressure sensor $p_{ND}'$ at the third-mentioned position, a pressure approximation value $p_{ND\_Vert}$ and $p_{ND\_KMV}$ is determined for the position of the temperature sensors T downstream of the chiller 3 and at the inlet side of the coolant compressor 5, thus the temperature sensors $T_{CH}$ and $T_{KMV2}$. However, in this system section, the arrangement of the pressure sensor $p_{ND}'$ is only reasonable for the case of dispensing with the check valve R1. In the case of a segmented system section expansion element AE1 to check valve R1, inconsistent working pressures which are fed back can occur, which are not transferable to the active system sections.

To calculate these pressure approximation values $p_{ND\_CH}$, $p_{ND\_VERD}$, and $p_{ND\_KMV}$, a pressure loss calculation function is provided and implemented as an algorithm in the control unit of the air conditioning system 10. Starting from the position of the low-pressure-side pressure sensor as the pressure sensor $p_{ND}$, $p_{ND}'$, or $p_{ND}''$, the pressure loss $\Delta p$ is calculated by means of the pressure loss calculation function up to the position of each of the temperature sensors $T_{CH}$, $T_{VERD}$, and $T_{KMV2}$ on the basis of the coolant mass flow conveyed by the coolant compressor 5. From this pressure loss $\Delta p$ and the low-pressure measured value $p_{ist\_ND}$ of the pressure sensor $p_{ND}$, $p_{ND}'$, or $p_{ND}''$, the pressure approximation value $p_{ND\_CH}$, $p_{ND\_VERD}$, and $p_{ND\_KMV}$ is calculated.

This method is explained in detail hereinafter.

First, the coolant mass flow $m_{KM\_berechnet}$ presently conveyed by the coolant compressor 5 is calculated from its operating data, as already explained above.

In the next step, the corresponding pressure loss $\Delta p_{CH}$, $\Delta p_{VERD}$, $\Delta p_{IWT}$, $\Delta p_{VERD/R1}$, and $\Delta p_{IWT/R1}$ is determined in each case by means of a mass flow-pressure loss characteristic curve which indicates the pressure loss between the position of the pressure sensor $p_{ND}$, $p_{ND}'$, or $p_{ND}''$ and the position of the respective temperature sensors $T_{CH}$, $T_{VERD}$, and $T_{KMV2}$ and $T_{KMV2}$ and the additional components having active flow through them between the position of the pressure sensor $p_{ND}$, $p_{ND}'$, or $p_{ND}''$ and the respective position of the temperature sensors $T_{CH}$, $T_{VERD}$, and $T_{KMV2}$. These mass flow-pressure loss characteristic curves are stored as a characteristic curve map in the control unit of the refrigeration system 10 and are generated on a test stand or by simulation.

From the sum of the respective pressure loss and the low-pressure measured value $p_{ist\_ND}$ of the corresponding pressure sensor $p_{ND}$, $p_{ND}'$, or $p_{ND}''$, the respective pressure approximation value is calculated as a function of the position of the pressure sensors.

For the pressure sensor $p_{ND}$, the following applies:

$p_{ND\_CH} = p_{ist\_ND} + \Delta p_{CH}$, $p_{ND\_VERD} = p_{ist\_ND} + \Delta p_{VERD}$.

For the pressure sensor $p_{ND}'$, the following applies:

$p_{ND\_VERD} = p_{ist\_ND}' + \Delta p_{VERD/R1}$, $p_{ND\_KMV} = p_{ist\_ND}' - \Delta p_{IWT}$.

For the pressure sensor $p_{ND}''$ the following applies:

$p_{ND\_CH} = p_{ist\_ND}'' + \Delta p_{CH}$, $p_{ND\_KMV} = p_{ist\_ND}'' - \Delta p_{IWT/R1}$.

For the calculation of the low-pressure approximation value $\Delta p_{VERD}$ at the interior evaporator 2, in addition the pressure loss over the check valve R1 is also to be considered and in the case of the corresponding arrangement of the pressure sensor $p_{ND}''$, in general the use of the check valve R1 is to be checked.

A pressure loss calculation chain thus results for the low-pressure sensor $p_{ND}$, which with respect to the temperature sensor $T_{VERD}$ consists of the components of the low-pressure section of the internal heat exchanger 7, the corresponding line sections of the coolant circuit 1 between the position of the pressure sensor $p_{ND}$ and the position of the temperature sensor $T_{VERD}$ and the check valve R1 and, with respect to the temperature sensor $T_{CH}$, consists of the components of the low-pressure section of the internal heat exchanger 7 and the corresponding line sections.

For the pressure sensor $p_{ND}'$, with respect to the temperature sensor $T_{KMV2}$, a pressure loss calculation chain consists of the low-pressure section of the internal heat exchanger 7 and, with respect to the temperature sensor $T_{VRD}$, consists of the corresponding line sections and the check valve R1.

For the pressure sensor $p_{ND}'$, with respect to the temperature sensor $T_{KMV2}$, a pressure loss calculation chain consists of the check valve R1, the low-pressure section of the internal heat exchanger 7, and the corresponding line sections, and with respect to the temperature sensor $T_{CH}$, it consists of the check valve R1 and the corresponding line sections.

For each component which has to be incorporated in the pressure loss calculation chain between the position of the low-pressure sensor as the pressure sensor $p_{ND}$, $p_{ND}'$, or $p_{ND}'$ and the point for which the pressure approximation value is to be calculated, a pressure loss is to be ascertained on the test stand or by simulation as a function of the presently conveyed coolant mass flow to be able to generate the corresponding mass flow-pressure loss characteristic curve therefrom for such a pressure loss calculation chain.

The described function is in turn independent of whether the components "heat exchangers" are embodied as directly or indirectly functioning components, i.e. independently of whether heat or cold is transferred from the coolant with or without intermediate medium at the destination.

If a thermal expansion element TXV is used instead of an electrical expansion element, for example AE1 or AE2, the heat exchanger following downstream of the thermal expansion element TXV is not necessarily to have a temperature sensor connected downstream, since a TXV cannot be actively influenced in its mode of operation via the control unit.

In addition to the embodiment described here of the separate arrangement of pressure and temperature sensors, at points which have a pressure and temperature sensor directly adjacent, the combination of these two signal pickups in one combination sensor is alternatively possible.

In addition to the described method for deriving pressure signal values in a low-pressure and high-pressure section, this procedure can also be applied for intermediate or moderate operating pressures and this can be the case both in refrigeration system applications and also heat pump applications.

The described methods can be used for all known coolants, such as R744, R134a, R1234yf, etc., whereby exclusively the low-pressure coolant collector 8 is considered especially for R744 systems.

REFERENCE SIGNS

1 Coolant circuit
1.1 High-pressure section of the coolant circuit 1
1.2 Low-pressure section of the coolant circuit 1
2 Evaporator
3 Chiller
3.10 Refrigerant circuit of chiller 3
5 Coolant compressor
5.1 High-pressure outlet of coolant compressor 5
5.2 Low-pressure inlet of coolant compressor 5
6 Heat exchanger
7 Internal heat exchanger
8 Low-pressure accumulator
8.1 High-pressure accumulator
10 Refrigeration system
AE1 Expansion element
AE2 Expansion element
K1 Connecting point
$m_{KM\_berechnet}$ Coolant mass flow
$p_{ist\_ND}$ Low-pressure measured value
$p_{ist\_HD}$ High-pressure measured value
$p_{ND}$ Low-pressure-side pressure sensor
$p_{ND}'$ Low-pressure-side pressure sensor
$p_{ND}''$ Low-pressure-side pressure sensor
$p_{ND\_CH}$ Pressure approximation value
$p_{ND\_KMV}$ Pressure approximation value
$p_{ND\_IWT}$ Pressure approximation value
$p_{ND\_VERD}$ Pressure approximation value
$p_{HD}$ High-pressure-side pressure sensor $p_{HD}$' High-pressure-side pressure sensor
$p_{HD\_Kond/GK}$ Pressure approximation value
$p_{HD\_KMV}$ Pressure approximation value
R1 Check valve
$T_{CH}$ Temperature sensor
$T_{IWT}$ Temperature sensor
$T_{Kond/GK}$ Temperature sensor
$T_{KMV}$ Temperature sensor
$T_{KMV1}$ Temperature sensor
$T_{KMV2}$ Temperature sensor
$T_{VERD}$ Temperature sensor
$\Delta_p$ Pressure loss value
$\Delta p_{CH}$ Pressure loss value
$\Delta p_{IWT}$ Pressure loss value
$\Delta p_{IWT/R1}$ Pressure loss value
$\Delta p_{VERD}$ Pressure loss value
$\Delta p_{VERD/R1}$ Pressure loss value
$\Delta p_{Kond/GK}$ Pressure loss value

The invention claimed is:

1. A method for operating a coolant circuit of a refrigeration system of a vehicle comprising a low-pressure system section and a high-pressure system section, the method comprising:
    setting a system operating state of each system section with respect to pressure and temperature of coolant by a control unit;
    transmitting sensor signals of a respective pressure sensor arranged in each system section to the control unit for the control or regulation of the refrigeration system;
    conveying coolant from the low-pressure system section into the high-pressure system section by a coolant compressor as a further component of the coolant circuit,
    detecting a coolant temperature by a temperature sensor connected downstream of an outlet of the coolant component;
    transmitting the sensor signal of the temperature sensor to the control unit;
    calculating a pressure approximation value at the position of the temperature sensor by a pressure loss value determined using a pressure loss calculation function starting from a position of the pressure sensor arranged in the system section of the component up to a position of the temperature sensor, wherein the temperature sensor and the pressure sensor are arranged at different positions in the system sections; and
    controlling the refrigeration system as a function of the calculated pressure approximation value.

2. The method as claimed in claim 1, wherein an external direct or indirect coolant-air heat exchanger is arranged in the high-pressure system section, the pressure sensor provided for the high-pressure system section is arranged downstream of the high-pressure outlet of the coolant compressor or the coolant-air heat exchanger, and one temperature sensor is arranged downstream of each of the coolant compressor and the external direct or indirect coolant-air heat exchanger.

3. The method as claimed in claim 1, wherein an interior evaporator and a chiller are arranged as components in the low-pressure system section, a low-pressure accumulator is arranged in the low-pressure system section, the pressure sensor provided for the low-pressure system section is arranged downstream of either the low-pressure accumulator or the chiller, and a temperature sensor is arranged downstream of each of the chiller and the low-pressure accumulator.

4. The method as claimed in claim 1, wherein an interior evaporator and a chiller are arranged as components in the low-pressure system section, a high-pressure accumulator is arranged in the high-pressure system section, the pressure sensor provided for the low-pressure system section is arranged either at the low-pressure inlet of the coolant compressor, at the outlet of the chiller, or at the outlet of the interior evaporator, and a temperature sensor is arranged downstream in each case at the outlet of the chiller, at the outlet of the interior evaporator, and at the low-pressure inlet of the coolant compressor.

5. The method as claimed in claim 1, further comprising:
    comparing both pressure values and temperature values to thresholds; and
    reducing activation of the coolant compressor after either value exceeds a maximum threshold.

6. The method as claimed in claim 2, wherein an interior evaporator and a chiller are arranged as components in the low-pressure system section, a low-pressure accumulator is arranged in the low-pressure system section, the pressure sensor provided for the low-pressure system section is arranged downstream of either the low-pressure accumulator or the chiller, and a temperature sensor is arranged downstream of each of the chiller and the low-pressure accumulator.

7. The method as claimed in claim 2, wherein an interior evaporator and a chiller are arranged as components in the low-pressure system section, a high-pressure accumulator is arranged in the high-pressure system section, the pressure sensor provided for the low-pressure system section is arranged either at the low-pressure inlet of the coolant compressor, at the outlet of the chiller, or at the outlet of the interior evaporator, and a temperature sensor is arranged downstream in each case at the outlet of the chiller, at the outlet of the interior evaporator, and at the low-pressure inlet of the coolant compressor.

8. The method as claimed in claim 2, further comprising:
    comparing both pressure values and temperature values to thresholds; and
    reducing activation of the coolant compressor after either value exceeds a maximum threshold.

9. The method as claimed in claim 3, further comprising:
    comparing both pressure values and temperature values to thresholds; and
    reducing activation of the coolant compressor after either value exceeds a maximum threshold.

10. The method as claimed in claim 4, further comprising:
    comparing both pressure values and temperature values to thresholds; and
    reducing activation of the coolant compressor after either value exceeds a maximum threshold.

* * * * *